(12) United States Patent
Saiga et al.

(10) Patent No.: US 7,031,531 B1
(45) Date of Patent: Apr. 18, 2006

(54) IMAGE ENCODING DEVICE AND METHOD THEREFOR, IMAGE DECODING APPARATUS AND METHOD THEREFOR, AND COMPUTER-READABLE RECORDED MEDIUM ON WHICH IMAGE ENCODING PROGRAM AND IMAGE DECODING PROGRAM ARE RECORDED

(75) Inventors: Hisashi Saiga, Yamatokoriyama (JP); Keisuke Iwasaki, Ikoma-gun (JP); Kensaku Kagechi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 767 days.

(21) Appl. No.: 10/049,513

(22) PCT Filed: Aug. 14, 2000

(86) PCT No.: PCT/JP00/05450

§ 371 (c)(1),
(2), (4) Date: Feb. 12, 2002

(87) PCT Pub. No.: WO01/17230

PCT Pub. Date: Mar. 8, 2001

(30) Foreign Application Priority Data

Aug. 27, 1999 (JP) ................................ 11-240712

(51) Int. Cl.
*G06K 9/00* (2006.01)
(52) U.S. Cl. ...................... 382/232; 382/247; 382/248; 382/250
(58) Field of Classification Search ................ 382/248, 382/232, 250, 247; 345/545, 634; 358/426.01; 348/141
See application file for complete search history.

(56) References Cited

U.S. PATENT DOCUMENTS

| 4,652,935 | A | * | 3/1987 | Endoh et al. ........... 358/426.11 |
| 4,951,229 | A | * | 8/1990 | DiNicola et al. ........... 345/533 |
| 5,442,458 | A | * | 8/1995 | Rabbani et al. ............ 382/247 |
| 5,603,043 | A | * | 2/1997 | Taylor et al. ................. 712/1 |
| 5,881,173 | A | | 3/1999 | Ohmori ...................... 382/232 |
| 6,477,277 | B1 | * | 11/2002 | Chippendale et al. ....... 382/232 |

FOREIGN PATENT DOCUMENTS

| JP | 63-296564 A | 12/1988 |
| JP | 05-030496 A | 2/1993 |
| JP | 05-145766 A | 6/1993 |

(Continued)

OTHER PUBLICATIONS

Vaisey et al., "Bitgroup Modeling of Signal Data for Image Compression", IEEE, Mar. 1995, pp. 466.*

(Continued)

*Primary Examiner*—Anh Hong Do
(74) *Attorney, Agent, or Firm*—David C. Conlin; David A. Tucker; Edwards Angell Palmer & Dodge LLP

(57) ABSTRACT

An image coding apparatus corresponding to a standard scheme of binary image compression and having the compression efficiency of a gray scale image improved includes: a bit plane generator (303) dividing unitary image data into a plurality of bit planes determined according to the number of bits forming each pixel, an image preprocessor (305) connected to the bit plane generator (303) to arrange bit data of the same position forming a plurality of bit planes in close proximity to combine into a single bit plane, and a data compressor (306) connected to the image preprocessor (305) to compress an image of the single bit plane.

36 Claims, 22 Drawing Sheets

FOREIGN PATENT DOCUMENTS

| | | |
|---|---|---|
| JP | 06-113333 A | 4/1994 |
| JP | 06-169407 A | 6/1994 |
| JP | 06-332667 A | 12/1994 |
| JP | 07-046532 A | 2/1995 |
| JP | 07-322070 A | 12/1995 |

OTHER PUBLICATIONS

Taiwanese Patent Office Action (Notice of Grounds of Rejection).

"Computer Vision and Image Processing", Scott E. Umbaugh, Chap. 5, pp. 244-247, 1998.

"Digital Image Compression Techniques", M. Rabbani, et al., vol. TT7, Ch. 6, pp. 51-53 and 181-182, 1991.

"14492FCD Information Technology-Coded Representation of Picture and Audio Information—Lossy/Lossless Coding of Bi-level Images", ISO/IEC JTC1/SC29/WG1 N1359, JBIG Committee, Jul. 16, 1999, pp. 11.

* cited by examiner

FIG. 1  PRIOR ART

First Apparition: Macbeth! Macbeth! Macbeth! Beware Macduff; Beware the thane of Fife. Dismiss me. Enough.
MACBETH: Whate'er thou art, for thy good caution, thanks; Thou hast harp'd my fear aright: but one word more...
First Witch: He will not be commanded: here's another, more potent than the first.
Second Apparition: Macbeth! Macbeth! Macbeth!
MACBETH: Had I three ears, I'ld hear thee.
Second Apparition: Be bloody, bold, and resolute; laugh to scorn the power of man, for none of woman born shall harm Macbeth.
MACBETH: Then live, Macduff: what need I fear of thee? But yet I'll make assurance double sure, And take a bond of fate: thou shalt not live; That I may tell pale-hearted fear it lies, and sleep in spite of thunder.
  What is this that rises like the issue of a king, and wears upon his baby-brow the round and top of sovereignty?
ALL: Listen, but speak not to't.
Third Apparition: Be lion-mettled, proud; and take no care who chafes, who frets, or where conspirers are: Macbeth shall never vanquish'd be until Great Birnam wood to high Dunsinane hill shall come against him.
MACBETH: That will never be. Who can impress the forest, bid the tree, unfix his earth-bound root? Sweet bodements! Good! Rebellion's head, rise never till the wood of Birnam rise, and our high-placed Macbeth shall live the lease of nature, pay his breath to time and mortal custom. Yet my heart throbs to know one thing: tell me, if your art can tell so much: shall Banquo's issue ever Reign in this kingdom?
ALL: Seek to know no more.

FIG. 2 PRIOR ART

First Apparition: Macbeth! Macbeth! Macbeth! Beware Macduff; Beware the thane of Fife. Dismiss me. Enough.
MACBETH: Whate'er thou art, for thy good caution, thanks; Thou hast harp'd my fear aright: but one word more...
First Witch: He will not be commanded: here's another, more potent than the first.
Second Apparition: Macbeth! Macbeth! Macbeth!
MACBETH: Had I three ears, I'ld hear thee.
Second Apparition: Be bloody, bold, and resolute; laugh to scorn the power of man, for none of woman born shall harm Macbeth.
MACBETH: Then live, Macduff: what need I fear of thee? But yet I'll make assurance double sure, And take a bond of fate: thou shalt not live; That I may tell pale-hearted fear it lies, and sleep in spite of thunder.
  What is this that rises like the issue of a king, and wears upon his baby-brow the round and top of sovereignty?
ALL: Listen, but speak not to't.
Third Apparition: Be lion-mettled, proud; and take no care who chafes, who frets, or where conspirers are: Macbeth shall never vanquish'd be until Great Birnam wood to high Dunsinane hill shall come against him.
MACBETH: That will never be. Who can impress the forest, bid the tree, unfix his earth-bound root? Sweet bodements! Good! Rebellion's head, rise never till the wood of Birnam rise, and our high-placed Macbeth shall live the lease of nature, pay his breath to time and mortal custom. Yet my heart throbs to know one thing: tell me, if your art can tell so much: shall Banquo's issue ever Reign in this kingdom?
ALL: Seek to know no more.

FIG. 3 PRIOR ART

First Apparition: Macbeth! Macbeth! Macbeth! Beware Macduff; Beware the thane of Fife. Dismiss me. Enough
MACBETH: Whate'er thou art, for thy good caution, thanks; Thou hast harp'd my fear aright, but one word more ..
First Witch: He will not be commanded: here's another, more potent than the first.
Second Apparition: Macbeth! Macbeth! Macbeth!
MACBETH: Had I three ears, I'd hear thee
Second Apparition: Be bloody, bold, and resolute; laugh to scorn the power of man, for none of woman born shall harm Macbeth.
MACBETH: Then live, Macduff: what need I fear of thee? But yet I'll make assurance double sure, And take a bond of fate: thou shalt not live; That I may tell pale-hearted fear it lies, and sleep in spite of thunder
 What is this that rises like the issue of a king, and wears upon his baby-brow the round and top of sovereignty?
ALL: Listen, but speak not to't.
Third Apparition: Be lion-mettled, proud; and take no care who chafes, who frets, or where conspirers are: Macbeth shall never vanquish'd be until Great Birnam wood to high Dunsinane hill shall come against him.
MACBETH: That will never be. Who can impress the forest, bid the tree, unfix his earth-bound root? Sweet bodements! Good! Rebellion's head, rise never till the wood of Birnam rise, and our high-placed Macbeth shall live the lease of nature, pay his breath to time and mortal custom. Yet my heart throbs to know one thing: tell me, if your art can tell so much, shall Banquo's issue ever Reign in this kingdom?
ALL: Seek to know no more.

| PIXEL VALUE | BINARY REPRESENT-ATION | | | PIXEL VALUE OF THE FIRST PLANE | PIXEL VALUE OF THE SECOND PLANE | PIXEL VALUE OF THE THIRD PLANE |
|---|---|---|---|---|---|---|
| 0 | 0 | 0 | 0 | 0 | 0 | 0 |
| 1 | 0 | 0 | 1 | 0 | 0 | 1 |
| 2 | 0 | 1 | 0 | 0 | 1 | 0 |
| 3 | 0 | 1 | 1 | 0 | 1 | 1 |
| 4 | 1 | 0 | 0 | 1 | 0 | 0 |
| 5 | 1 | 0 | 1 | 1 | 0 | 1 |
| 6 | 1 | 1 | 0 | 1 | 1 | 0 |
| 7 | 1 | 1 | 1 | 1 | 1 | 1 |

FIG.9

PLANE 0

| 0 0 0 | 0 0 1 |
|---|---|
| 0 1 0 | 0 1 1 |

⋮

PLANE 1

| 1 0 0 | 1 0 1 |
|---|---|
| 1 1 0 | 1 1 1 |

⋮

PLANE 2

| 2 0 0 | 2 0 1 |
|---|---|
| 2 1 0 | 2 1 1 |

⋮

PLANE 3

| 3 0 0 | 3 0 1 |
|---|---|
| 3 1 0 | 3 1 1 |

⋮

COMPOSITE PLANE

| 0 0 0 | 1 0 0 | 0 0 1 | 1 0 1 |
|---|---|---|---|
| 2 0 0 | 3 0 0 | 2 0 1 | 3 0 1 |
| 0 1 0 | 1 1 0 | 0 1 1 | 1 1 1 |
| 2 1 0 | 3 1 0 | 2 1 1 | 3 1 1 |

| CONTENTS | SIZE (IN BYTES) |
|---|---|
| NUMBER OF PLANES (N) | 2 |
| SIZE OF COMPRESSED DATA OF PLANE 0(S[0]) | 4 |
| SIZE OF COMPRESSED DATA OF PLANE 1(S[1]) | 4 |
| : | : |
| SIZE OF COMPRESSED DATA OF PLANE N-1 (S[N − 1]) | 4 |
| COMPRESSED DATA OF PLANE 0 | S[0] |
| COMPRESSED DATA OF PLANE 1 | S[1] |
| : | : |
| COMPRESSED DATA OF PLANE N-1 | S[N − 1] |

IMAGE ENCODING DEVICE AND METHOD THEREFOR, IMAGE DECODING APPARATUS AND METHOD THEREFOR, AND COMPUTER-READABLE RECORDED MEDIUM ON WHICH IMAGE ENCODING PROGRAM AND IMAGE DECODING PROGRAM ARE RECORDED

TECHNICAL FIELD

The present invention relates to an apparatus and a method of image coding, an apparatus and a method of image decoding, and a computer-readable recording medium recorded with respective image coding and image decoding programs. Particularly, the present invention relates to an apparatus and a method of image coding that allows a higher compression rate using a hardware or software module that performs currently-available image compression processing, an apparatus and a method of image decoding, and a computer-readable recording medium recorded with respective image coding and decoding programs.

BACKGROUND ART

The compression scheme of text image was conventionally implemented using the MMR (Modified Modified Read) or JBIG (Joint Bi-level Image Coding Experts Groups) features that process the text image as binary image. The reason why a text image is handled as a binary image may be the nature of the text image that allows image processing by identifying the background of the text image from the text region.

The standards of the MMR or JBIG are developed focusing on application to facsimile (referenced document: ISO/IEC JTC1/SC29/WG1 N1359, "14492 FCD Information Technology—Coded Representation of Picture and Audio Information—Lossy/Lossless Coding of Bi-level Images", JBIG Committee (Jul. 16, 1999)). At the current stage, they are substantially the standard scheme for binary image compression. In the compression schemes of MMR, JBIG and the like, reusability is contemplated through modularization by hardware or software. The hardware device particularly has high usage efficiency in apparatuses with poor CPU (Central Processing Unit) power such as portable information terminals that have difficulty in effecting image compression processing by software from the standpoint of the processing rate.

In contrast, compression of a text image formed of a gray scale image was carried out by the scheme of dividing a gray scale image into a plurality of weighted bit planes, each represented as a binary image, to divide the gray scale image into a plurality of binary images for processing. Such an example is shown in FIG. 1. FIG. 1 corresponds to an octal image in which each pixel can take any eight values (0–7). FIGS. 2–4 correspond to the division of the octal image into three planes. Each plane corresponds to each digit of the original image represented in binary of three digits. Here, the value of each plane is determined depending upon whether each digit is 0 or 1. The first plane shown in FIG. 2 corresponds to the most significant digit of the three digits. The second plane shown in FIG. 3 corresponds to the second most significant digit. The third plane shown in FIG. 4 corresponds to the least significant digit.

By dividing a gray scale image into binary bit planes, the binary image compression scheme can be employed in the compression of a gray scale image.

According to the aforementioned conventional compression scheme, each of the first to third planes is compressed into a binary image independent of other planes. There was a problem that the amount of compression increases since the correlation between respective planes is not utilized. For example, in the case where an image constituted by just the value of 0 (represented as 000 in binary of 3 digits) and the value of 7 (represented as 111 in binary of 3 digits) is to be compressed from an octal image that can take any of the 8 values of 0–7, the contents of the first to third planes are all identical according to the aforementioned bit plane generation method. Even though there is only information of one plane, the compression size increases to as much as three times thereof since each plane is compressed independently.

Although this is an extreme example, there is a definite correlation between each plane also in a general text image. Although the first plane shown in FIG. 2 is slightly degraded in picture quality, the contents of the original text can be generally read. The second plane shown in FIG. 3 and the third plane shown in FIG. 4, though gradually degraded in picture quality, can be recognized to a level so as to work out the original text or so as to locate the characters in the original text. This means that the pixel values of respective pixels corresponding to each plane are not independent, i.e., have a correlation.

A compression scheme utilizing the correlation between bit planes to solve the above problem is disclosed in Japanese Patent Laying-Open No. 63-296564. According to this compression scheme, the most significant plane is coded by a first coding method and the planes of the lower level are coded with linear prediction using pixels of bit planes already coded or pixels already coded in the relevant bit plane.

Although the problem of the compression size being increased can be alleviated, this compression scheme does not correspond to the binary image compression standard scheme of MMR, JBIG, or the like. This imposes the problem that the currently-available hardware or software modules cannot be reused.

DISCLOSURE OF THE INVENTION

The present invention is directed to solving the above problem. An object of the present invention is to provide an image coding apparatus and a method utilizing to the standard scheme of binary image compression and improving the compression efficiency of a gray scale image, an image decoding apparatus and method, and a computer-readable recording medium recorded with respective image coding and decoding programs.

Another object of the present invention is to provide an image coding apparatus and method utilizing to the standard compression scheme compressing a continuous images and improving the compression efficiency, an image decoding apparatus and method, and a computer-readable recording medium recorded with respective image coding and decoding programs.

According to an aspect of the present invention, an image coding apparatus includes a bit plane generator dividing unitary image data into a plurality of bit planes determined depending upon the number of bits forming each pixel, an image preprocessor connected to the bit plane generator to arrange bit data of the same position forming a plurality of bit planes in close proximity to combine into a single bit plane, and a data compressor connected to the image preprocessor to compress the image of the single bit plane.

Following division of the unitary image data into a plurality of bit planes, bit data of the same position forming a plurality of bit planes are arranged so as to be in close proximity to combine into a single bit plane by which an image is compressed. Accordingly, the amount of compression can be reduced in the compression process of a gray scale image. This method can accommodate the existing standard scheme of binary image compression, and allows usage of the currently-available hardware or software module.

Preferably, the image preprocessor extracts data sequentially one line at a time from a plurality of bit planes to combine into a single bit plane.

In combining a plurality of bit planes into a single bit plane, processing can be effected on a line-by-line basis. Therefore, the amount of processing in combining a single bit plane can be reduced.

Further preferably, the data compressor includes a composite plane data compressor connected to the image preprocessor to compress the image of a single bit plane, and a bit plane data compressor connected to the image preprocessor to compress respective images of the plurality of bit planes. The image coding apparatus further includes a data size comparator connected to the composite plane data compressor and bit plane data compressor to compare the data size after image compression of the single bit plane with the total data size of each of the plurality of bit planes after image compression, and employing the data of the smaller size as the compressed data.

The present invention can accommodate both the method of compressing a plurality of bit planes after being combined into a single bit plane and the method of compressing a plurality of bit planes individually. Thus, the optimum compression method can always be employed independent of the characteristic of the data of the original image.

According to another aspect of the present invention, an image coding apparatus includes an image preprocessor arranging bit data of the same position forming a plurality of image data input continuously in close proximity to combine into unitary image data, and a data compressor connected to the image preprocessor to compress the image of the unitary image data.

In a plurality of image data such as a continuous motion picture, correlation is established between bit data of the same position. Taking advantage of this nature, the compression size can be reduced by combining unitary image data from a plurality of image data and then performing image compression. Furthermore, the currently-available standard method of image compression can be accommodated.

According to a further aspect of the present invention, an image decoding apparatus includes a data decompressor decompressing compressed data to a single bit plane, an image postprocessor connected to the data decompressor to decompose a single bit plane combined by arranging bit data of the same position forming a plurality of bit planes in close proximity into a plurality of bit planes, and a bit plane integrator connected to the image postprocessor to integrate a plurality of bit planes into image data with the value of each pixel in the plurality of bit planes as the bit value of each pixel.

The image data coded by the image coding apparatus can be decoded.

According to still another aspect of the present invention, an image decoding apparatus includes a data decompressor decompressing compressed data to a single bit plane, a data type determiner connected to the data decomposer to determine whether the single bit plane decompressed by the data decompresser is a bit plane corresponding to a plurality of bit planes compressed after being combined into a single bit plane, or a bit plane corresponding to a plurality of bit planes compressed individually, an image postprocessor connected to the data type determiner to selectively execute whether to decompose a single bit plane combined by arranging bit data of the same position forming a plurality of bit planes in close proximity into a plurality of bit planes based on the output of the data type determiner, and a bit plane integrator connected to the image postprocessor to integrate a plurality of bit planes into image data with the value of each pixel in the plurality of bit planes as the bit value of each pixel.

Based on the output result of the data type determiner, data of a plurality of bit planes compressed after being combined into a single bit plane, and data of a plurality of bit planes compressed individually can both be decoded.

According to a still further aspect of the present invention, an image decoding apparatus includes a data decompressor decompressing compressed data into unitary image data, and an image postprocessor connected to the data decompressor to decompose the unitary image data combined by arranging bit data of the same position forming a plurality of image data in close proximity into a plurality of image data.

The image data coded by the image coding apparatus can be decoded.

According to yet a further aspect of the present invention, an image coding method includes the steps of dividing unitary image data into a plurality of bit planes determined depending on the number of bits forming each pixel, arranging bit data of the same position forming a plurality of bit planes in close proximity to combine into a single bit plane, and compressing the image of the single bit plane.

Following division of the unitary image data into a plurality of bit planes, bit data of the same position forming a plurality of bit planes are arranged in close proximity to combine into a single bit plane by which the image is compressed. Accordingly, the compression size in the compression process of a gray scale image can be reduced. Furthermore, the standard scheme of the existing binary image compression can be accommodated to allow usage of the currently-available hardware or software module.

According to yet another aspect of the present invention, an image coding method includes the steps of arranging bit data of the same position forming a plurality of image data continuously input in close proximity to combine into unitary image data, and compressing the image of the unitary image data.

Correlation between bit data of the same position is established in a plurality of image data such as continuous motion pictures. Taking advantage of this characteristic, the compression size can be reduced by combining unitary image data from a plurality of image data for image compression. Furthermore, the standard scheme of the currently available image compression can be accommodated.

According to yet a still further aspect of the present invention, an image decoding method includes the steps of decompressing compressed data to a single bit plane, dividing the single bit plane combined by arranging bit data of the same position forming a plurality of bit planes in close proximity into a plurality of bit planes, and integrating the plurality of bit planes into image data with the value of each pixel of the plurality of bit planes as the bit number of each pixel.

The image data coded by the image coding method can be decoded.

According to an additional aspect of the present invention, an image decoding method includes the steps of decompressing compressed data to a single bit plane, determining whether the decompressed single bit plane is a bit plane corresponding to a plurality of bit planes compressed after being combined into a single bit plane or a bit plane corresponding to a plurality of bit planes compressed individually, selectively executing whether to decompose the single bit plane combined by arranging bit data of the same position forming the plurality of bit planes in close proximity into a plurality of bit planes based on the determination result, and integrating the plurality of bit planes into image data with the value of each pixel of the plurality of bit planes as the bit value of each pixel.

According to the output result of the data type determiner, data of a plurality of bit planes compressed after being combined into a single bit plane and data of a plurality of bit planes compressed individually can both be decoded.

According to another aspect of the present invention, an image decoding method includes the steps of decompressing compressed data to unitary image data, and decomposing the unitary image data combined by arranging bit data of the same position forming a plurality of image data in close proximity into a plurality of image data.

Image data coded by the image coding method can be decoded.

According to a further aspect of the present invention, a computer-readable recording medium is recorded with an image coding program causing a computer to execute the steps of dividing unitary image data into a plurality of bit planes determined depending upon the number of bits forming each pixel, arranging bit data of the same position forming a plurality of bit planes in close proximity to combine into a single bit plane, and compressing the image of the single bit plane.

Following division of the unitary image data into a plurality of bit planes, bit data of the same position forming the plurality of bit planes are arranged in close proximity to combine into a single bit plane from which the image is compressed. Accordingly, the compression size in the compression process of a gray scale image can be reduced. Furthermore, the standard scheme of the existing binary image compression can be accommodated to allow usage of the currently-available hardware or software module.

According to still another aspect of the present invention, a computer-readable recording medium is recorded with an image coding program causing a computer to execute the steps of arranging bit data of the same position forming a plurality of image data input continuously in close proximity to combine into unitary image data, and compressing the image of the unitary image data.

Correlation is established between bit data of the same position in a plurality of image data such as a continuous motion picture. Taking advantage of this characteristic, the compression size can be reduced by combining the plurality of image data into unitary image data for image compression. Furthermore, the standard scheme of the existing image compression can be accommodated.

According to a still further aspect of the present invention, a computer-readable medium is recorded with an image decoding program causing a computer to execute the steps of decompressing compressed data to a single bit plane, decomposing the single bit plane combined by arranging bit data of the same position forming a plurality of bit planes in close proximity into a plurality of bit planes, and integrating the plurality of bit planes into image data with the value of each pixel of the plurality of bit planes as the bit value of each pixel.

Image data coded by the image coding method can be decoded.

According to yet a further aspect of the present invention, a computer-readable recording medium is recorded with an image decoding program causing a computer to execute the steps of decompressing compressed data to a single bit plane, determining whether the decompressed single bit plane is a bit plane corresponding to a plurality of bit planes compressed after being combined into a single bit plane or a bit plane corresponding to a plurality of bit planes compressed individually, selectively executing whether to decompose the single bit plane combined by arranging bit data of the same position forming the plurality of bit planes arranged in close proximity into a plurality of bit planes based on the determination result, and integrating the plurality of bit planes into image data with the value of each pixel of the plurality of bit planes as the bit value of each pixel.

Based on the output result of the data type determiner, data of a plurality of bit planes compressed after being combined into a single bit plane and data of a plurality of bit planes compressed individually can both be decoded.

According to yet another aspect of the present invention, a computer-readable recording medium is recorded with an image decoding program causing a computer to execute the steps of decompressing compressed data to unitary image data, and decomposing the unitary image data combined by arranging bit data of the same position forming a plurality of image data in close proximity into a plurality of image data.

Image data coded by the image coding method can be decoded.

BRIEF DESCRIPTION OF THE DRAWINGS

FIG. 1 shows an example of a gray scale image.

Figure 4:
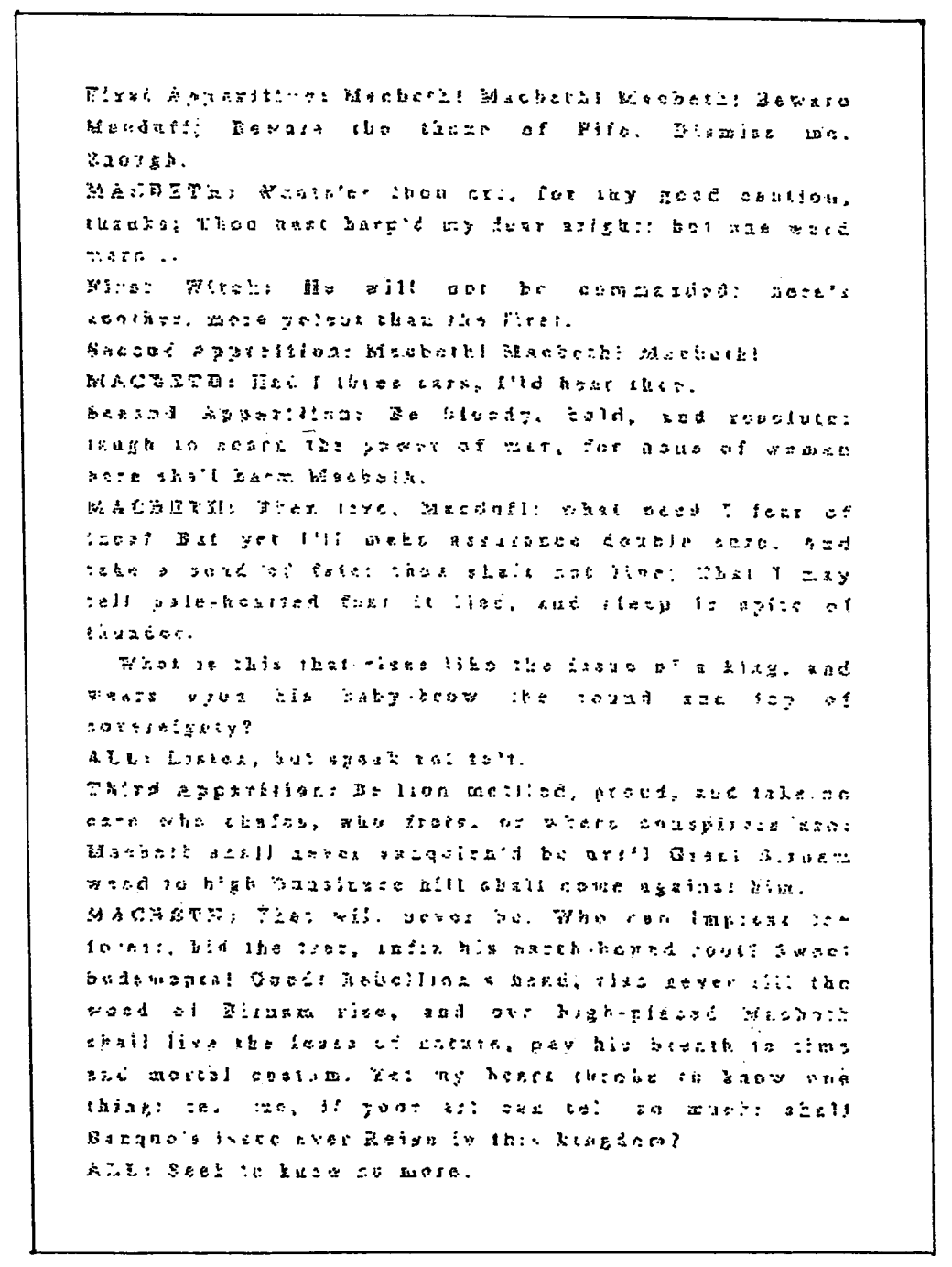

FIGS. 2–4 show examples of bit planes of the gray scale image of FIG. 1.

FIG. 7 shows an example of the bit plane generation rule of the gray scale image of FIG. 1.

FIG. 9 shows an exemplified method of combining four bit planes into a composite plane on a pixel-by-pixel basis.

FIG. 15 shows an example of rules to determine whether compressed data corresponds to a composite plane or data compressed for each plane.

BEST MODES FOR CARRYING OUT THE INVENTION

First Embodiment

Figure 5:
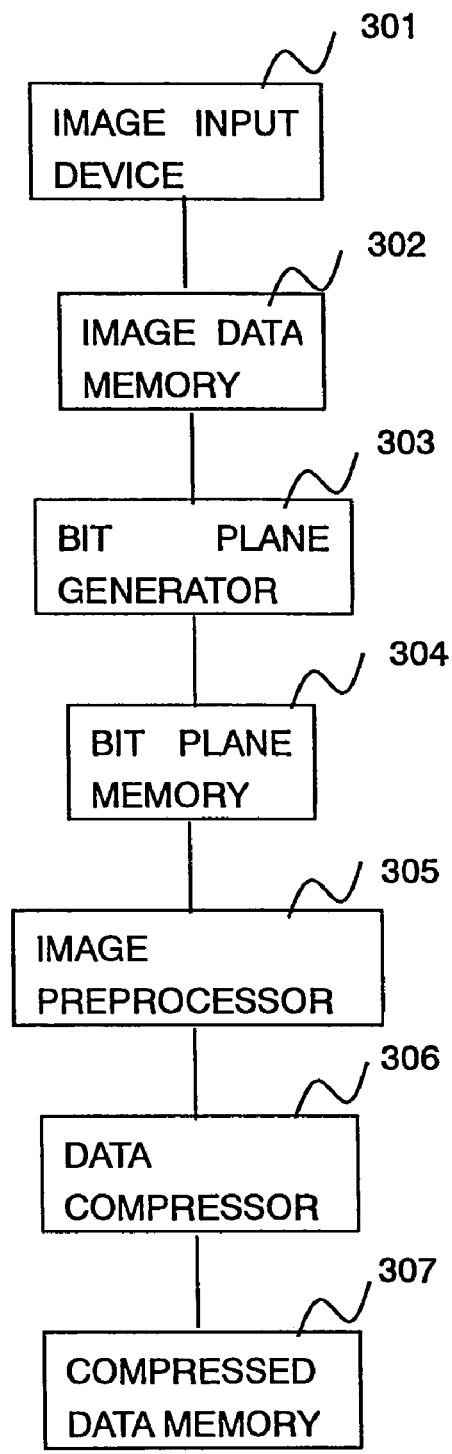
FIG. 5 is a block diagram showing a hardware structure of an image coding apparatus according to a first embodiment.

Referring to FIG. 5, an image coding apparatus according to the first embodiment includes an image input device 301 for entering an image, an image data memory 302 connected to image input device 301 to store image data applied by image input device 301, a bit plane generator 303 connected to image data memory 302 to divide the image data stored in image data memory 302 into bit planes, and a bit plane memory 304 connected to bit plane generator 303 to store the bit planes divided by bit plane generator 303.

The image coding apparatus further includes an image preprocessor 305 connected to bit plane memory 304 to combine data of each bit plane stored in bit plane memory 304 into a single plane (also called "composite plane"), a data compressor 306 connected to image preprocessor 305 to compress the composite plane, and a compressed data memory 307 connected to data compressor 306 to store compressed data output from data compressor 306.

Although a scanner is used as image input device 301, image input device 301 is not limited thereto.

Figure 6:
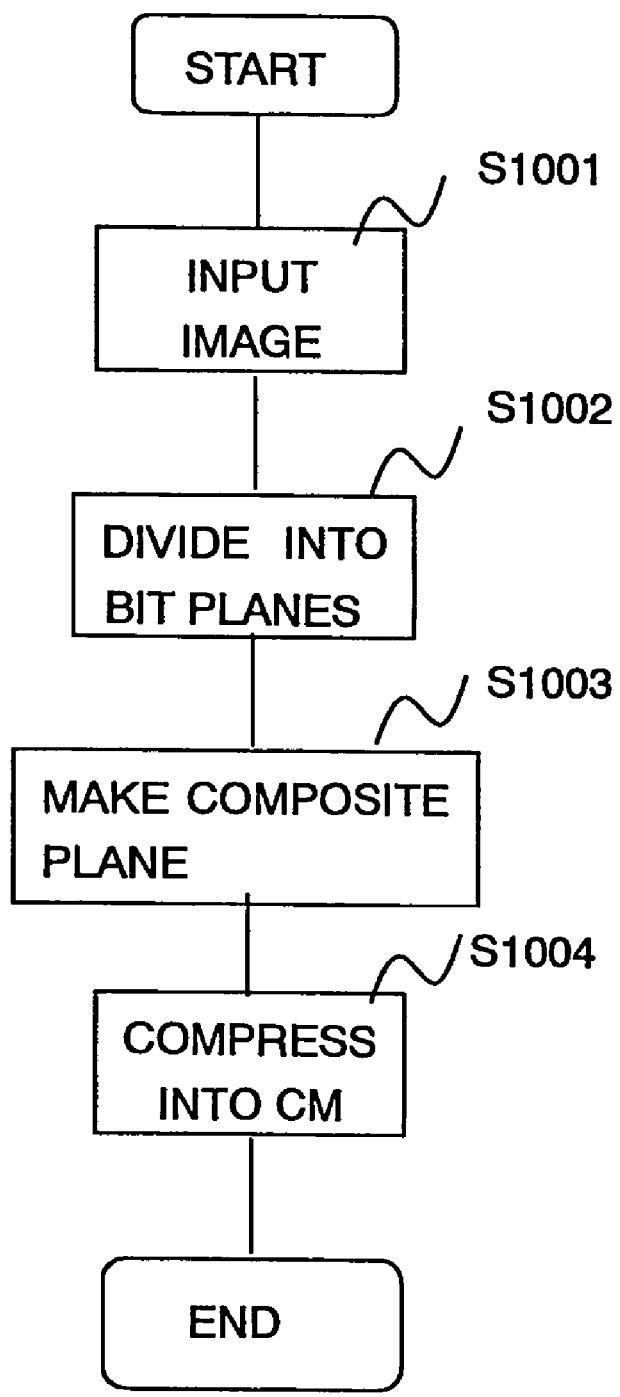
FIG. 6 is a flow chart of an image coding process of the first embodiment.

An image coding process using the image coding apparatus of FIG. 5 will be described here with reference to FIG. 6. The image data input through image input device 301 is written into image data memory 302 ("step" S1001 (step abbreviated hereinafter)).

The image data stored in image data memory 302 is divided into bit planes by bit plane generator 303 and stored in bit plane memory 304 (S1002). In the present embodiment, it is assumed that there are eight gray scale levels of the number of colors (gradation) of the original image (input image). The image stored in image data memory 302 takes any of the eight values of 0–7.

Although bit plane generator 303 divides the data into three bit planes, the present invention is not limited to three bit planes. However, it is to be noted that when the value of 2 exponentiated by the number of bit planes (the maximum gray scale level that can be represented by the combination of the bit planes) is lower than the number of gray scale levels of the original image, information will be lost when represented as a bit plane.

In the process of dividing the image data into bit planes at bit plane generator 303 it is assumed that the method of determining the pixel value of each bit plane conforms to the rules shown in FIG. 7. For example, when the pixel value of the original image is 0, all the pixel values in planes 1–3 are determined as 0. When the pixel value in the original image is 1, planes 1 and 2 have their pixel values set to 0 and plane 3 has it pixel value set to 1.

Figure 8:
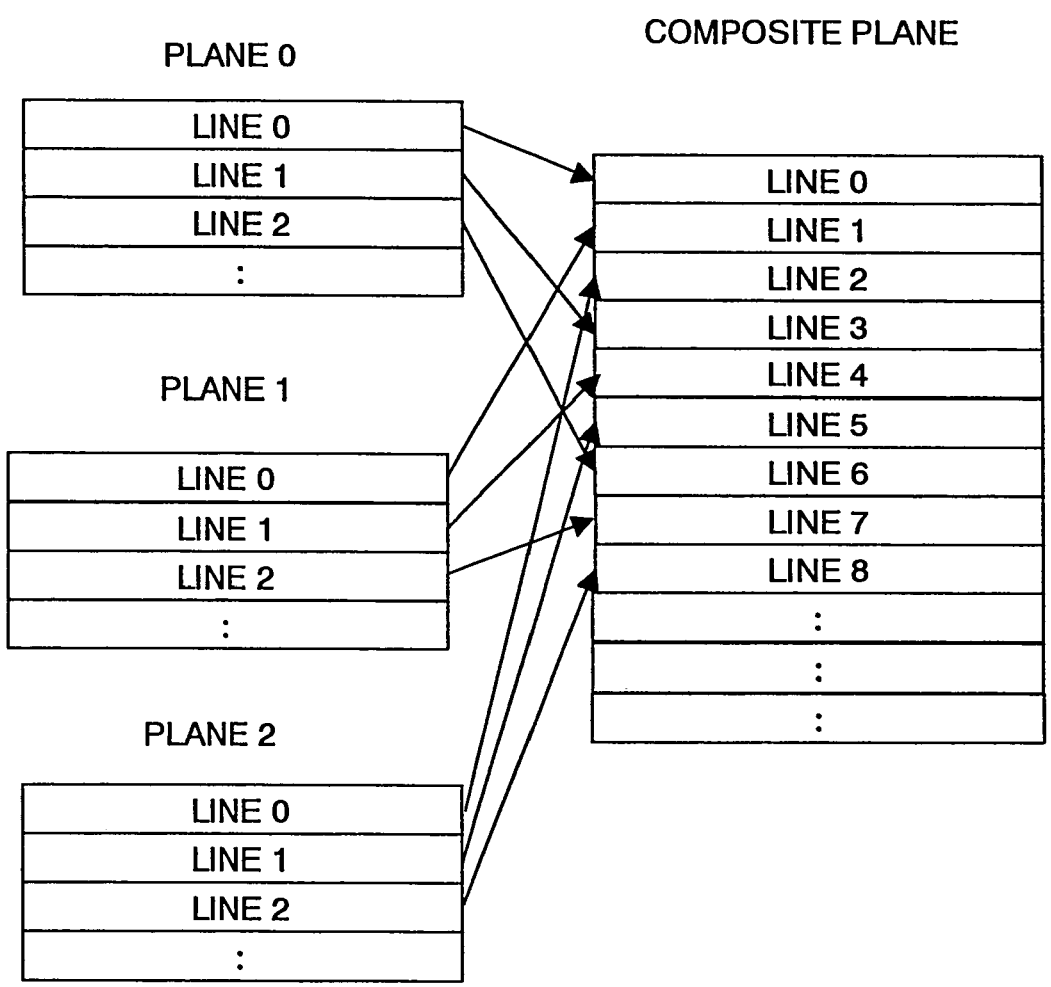
FIG. 8 shows an exemplified method of producing a composite plane from three bit planes.

The data of each bit plane stored in bit plane memory 304 are combined into a composite plane at image preprocessor 305 (S1003). FIG. 8 shows the method of combining three bit planes into a composite plane. Specifically, data of one line is sequentially output from the three planes to produce a composite plane. For example, line 0 of plane 0 is set to line 0 of the composite plane; line 0 of plane 1 is set to line 1 of the composite plane; line 0 of plane 2 is set to line 2 of the composite plane; and line 1 of plane 0 is set to line 3 of the composite plane. The produced composite plane has a horizontal width identical to that of the original image (or each bit plane prior to composite), and a vertical width three times that of the original image. The present invention is not limited to the line assemble method in producing a composite plane from respective bit planes shown in FIG. 8. Any method may be employed as long as the correlation between lines is increased.

The composite plane is compressed by data compressor 306 and stored in compressed data memory 307 (S1004). Although it is assumed that JBIG is employed as the compression scheme of data compressor 306 in the present embodiment, the present invention is not limited to this scheme. However, it is to be noted that a compression scheme taking advantage of the fact that the correlation between pixels positioned in close proximity is high is desirable for the purpose of implementing the present embodiment effectively. In other words, the inventive point of the present embodiment is that pixels of high correlation belonging to different bit planes are rearranged on a new bit plane so as to be positioned in close proximity on the same bit plane, and then compressed as one binary image. Therefore, the present invention can be operated effectively by employing a compression scheme that exhibits a high compression ratio when the correlation between pixels located in close proximity is high. Such a compression scheme includes MMR in addition to JBIG.

Alternatively, the vertical line may be employed in the method of combining a composite plane at image preprocessor 305 instead of combining in accordance with a horizontal direction line. Also, the combining process may be carried out on a pixel-by-pixel basis instead of the line-by-line basis.

FIG. 9 shows an exemplified method of combining a composite plane from four bit planes on a pixel-by-pixel basis. Although it is assumed that the number of planes in FIG. 9 is 4, the present invention is not limited to this number. According to FIG. 9, respective pixels in plane 0-plane 3 are arranged regularly in the composite plane. For example, in the case where the compression scheme by data compressor 306 is effected with four pixels located in close proximity as a unit, the correlation between each pixel can be increased by positioning each of the four pixels of plane 0-plane 3 corresponding to the same position (pixel 000 in plane 0, pixel 100 in plane 1, pixel 200 in plane 2 and pixel 300 in plane 3) in close proximity at the composite plane, which in turn can increase the compression ratio.

According to the present invention described above, following division of unitary image data into a plurality of bit planes, bit data of the same position forming a plurality of bit planes are arranged in close proximity to be combined into a single bit plane from which the image is compressed. Thus, compression amount can be reduced in the compression process of a gray scale image. Furthermore, the standard scheme of the existing binary image compression can be accommodated to allow usage of the currently-available hardware or software module.

Second Embodiment

Figure 10:
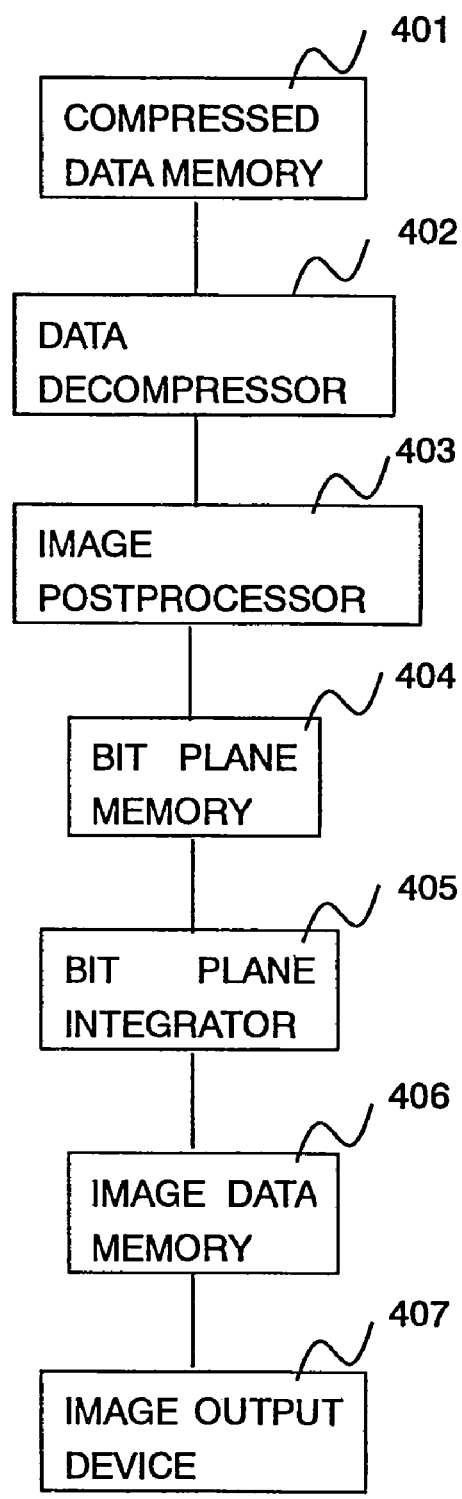
FIG. 10 is a block diagram showing a hardware structure of an image decoding apparatus of a second embodiment.

Referring to FIG. 10, an image decoding apparatus corresponding to the image coding apparatus of the first embodiment includes a compressed data memory 401 storing data compressed by the image coding apparatus, a data decompressor 402 connected to compressed data memory 401 to decompress compressed data, an image postprocessor 403 connected to data decompressor 402 to decompose the composite plane output from data decompressor 402 into bit planes, and a bit plane memory 404 connected to image postprocessor 403 to store a bit plane.

The image decoding apparatus further includes a bit plane integrator 405 connected to bit plane memory 404 to integrate bit planes to produce a gray scale image, an image data memory 406 connected to bit plane integrator 405 to store a gray scale image, and an image output device 407 connected to image data memory 406 to display a gray scale image.

Although it is assumed that a CRT (Cathode-Ray Tube) is employed as image output device 407 in the present embodiment, the present invention is not limited thereto.

Figure 11:
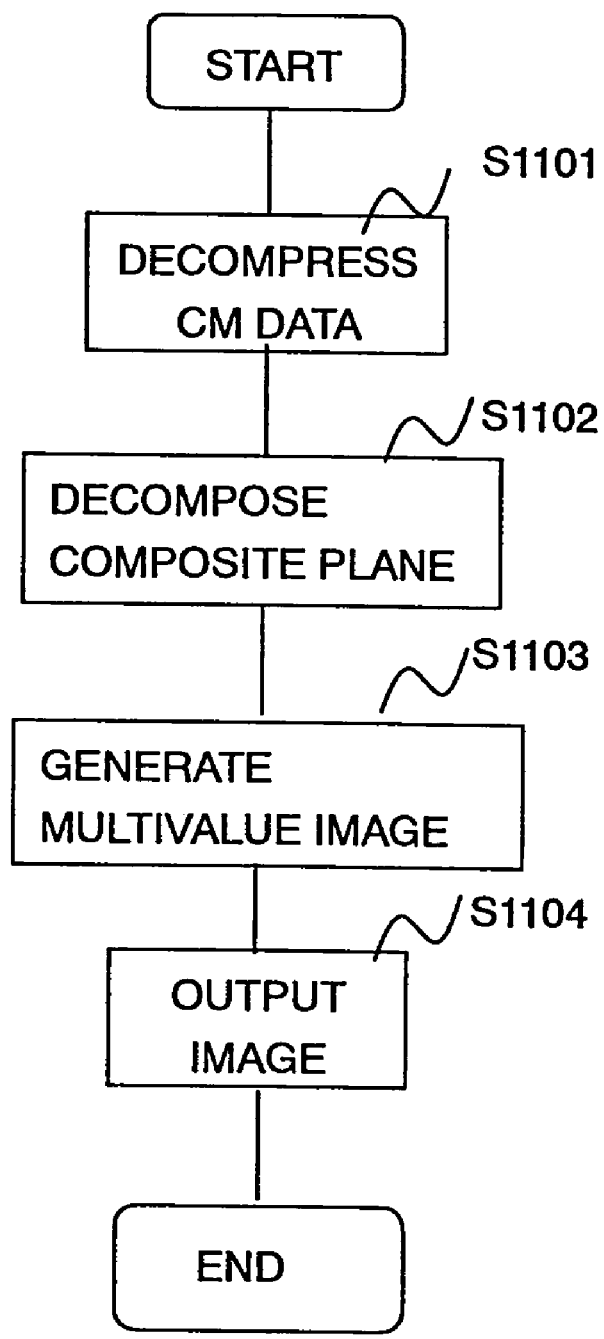
FIG. 11 is a flow chart of an image decoding process of the second embodiment.

An image decoding process using the image decoding apparatus of FIG. 10 will be described here with reference to FIG. 11. The compressed data stored in compressed data memory 401 is decompressed by data decompressor 402 and then supplied to image postprocessor 403 (S1101). Since the present embodiment corresponds to the first embodiment, the JBIG is employed in the decompression process by data decompressor 402.

Image postprocessor 403 decomposes the composite plane output from data decompressor 402 into bit planes. The bit planes are stored in bit plane memory 404 (S1102).

Figure 12:
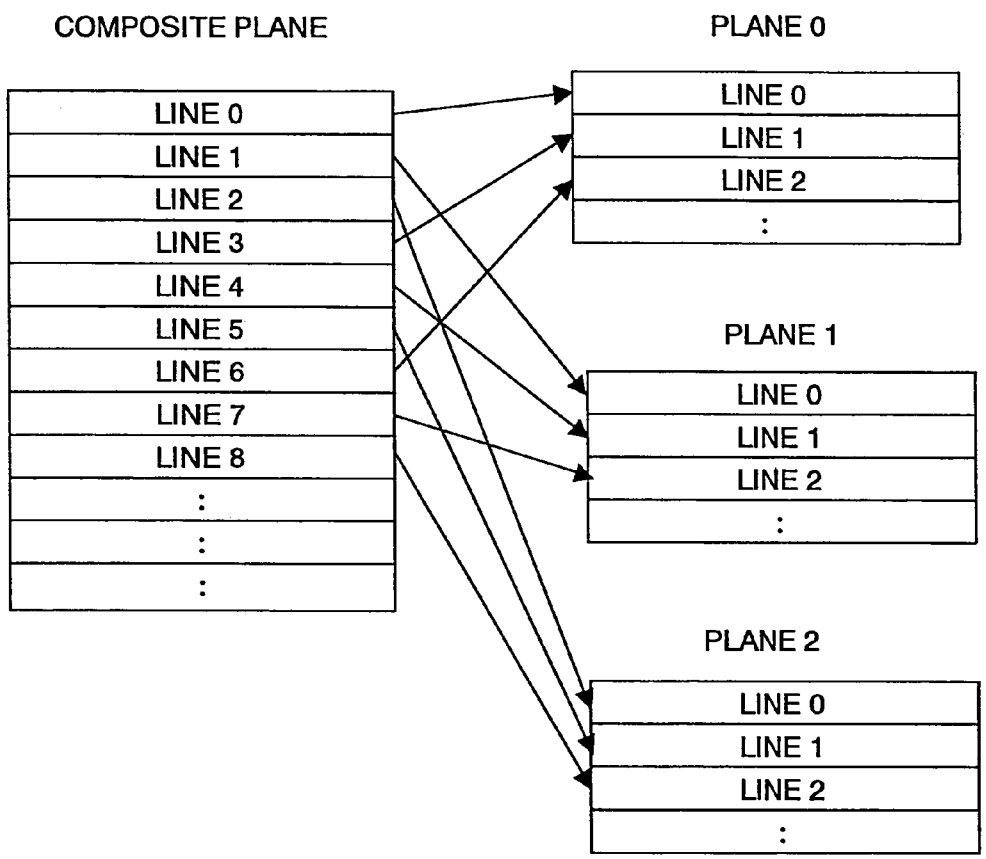
FIG. 12 shows an exemplified method of decomposing a composite plane into three bit planes in the second embodiment.

The process of decomposing the composite plane into three bit planes will be described with reference to FIG. 12. This process has a procedure opposite to that of the composite plane production procedure of the coding apparatus of FIG. 8. One line is sequentially output at a time from the composite plane to be decomposed into respective bit planes. For example, line 0 of the composite plane is set as line 0 of plane 0; line 1 of the composite plane is set as line 0 of plane 1; line 2 of the composite plane is set as line 0 of plane 2; and line 3 of the composite plane is set as line 1 of plane 0.

The bit plane output from image postprocessor 403 is stored in bit plane memory 404. Bit plane integrator 405 produces a gray scale image based on the contents of planes 1–3 stored in bit plane memory 404 according to the rule shown in FIG. 7. The produced gray scale image is stored in image data memory 406 (S1103).

The gray scale image decoded as described above is output to image output device 407 (S1104).

According to the present invention, image data coded by the image coding apparatus of the first embodiment can be decoded.

Third Embodiment

Figure 13:
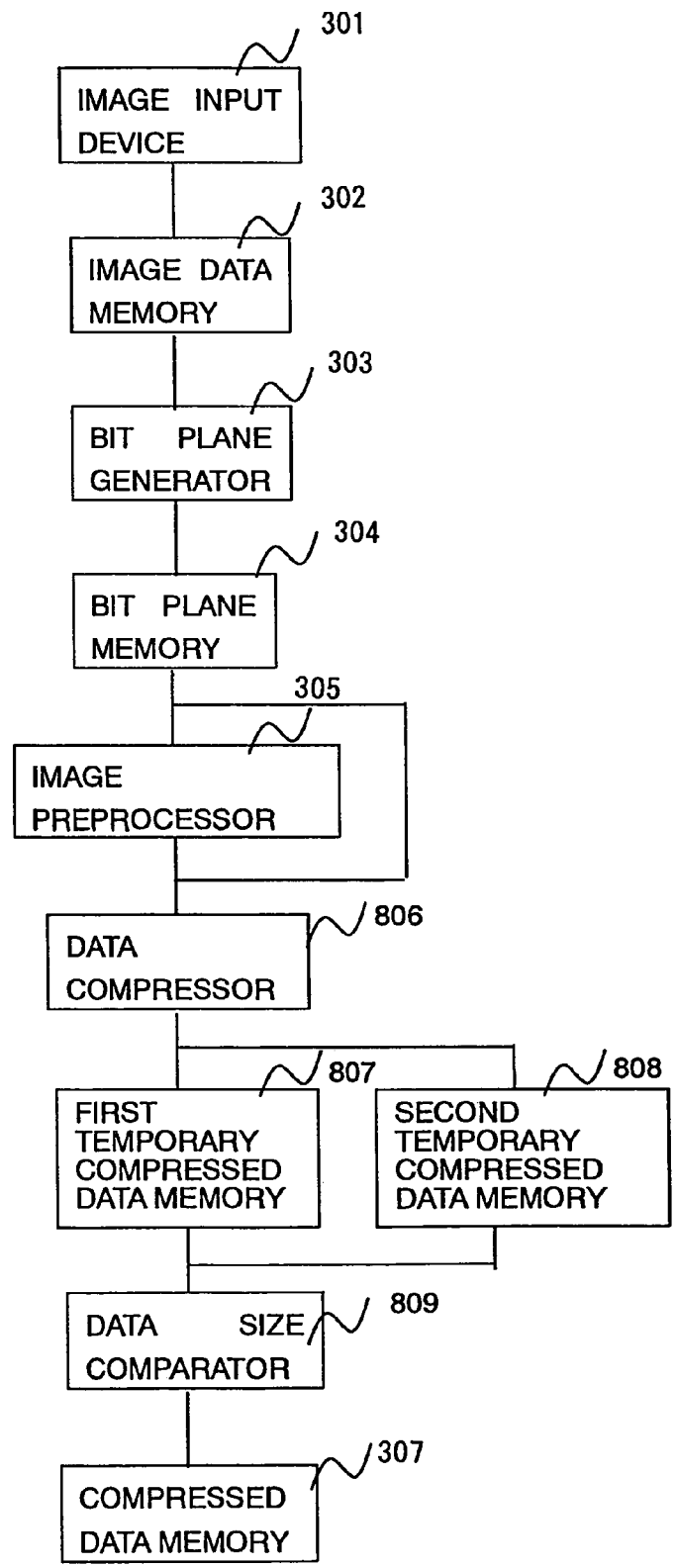
FIG. 13 is a block diagram showing a hardware structure of an image coding apparatus of a third embodiment.

Referring to FIG. 13, an image coding apparatus according to a third embodiment includes an image input device 301, an image data memory 302 connected to image input device 301, a bit plane generator 303 connected to image data memory 302, a bit plane memory 304 connected to bit plane generator 303, and an image preprocessor 305 connected to bit plane memory 304.

The image coding apparatus further includes a data compressor 806 connected to bit plane memory 304 and image preprocessor 305 to compress respective bit planes and composite planes, a first temporary compressed data memory 807 connected to data compressor 806 to temporarily store data corresponding to a compressed bit plane, a second temporary compressed data memory 808 connected to data compressor 806 to temporarily store data corresponding to a compressed composite plane, a data size comparator 806 connected to first and second temporary compressed data memories 807 and 808 to compare the size of data stored in first temporary compressed data memory 807 to the data stored in second temporary compressed data memory 808, and a compressed data memory 307 connected to data size comparator 809 to store compressed data that is stored in first temporary compressed data memory 807 or second temporary compressed data memory 808 based on the comparison result of data size comparator 809.

Components similar to those in FIG. 5 have the same reference characters allotted. Since the function and structure thereof are identical, detailed description thereof will not be repeated here.

Similar to the first embodiment, it is assumed that JBIG compression is employed at data compressor 806. However, the present invention is not limited to JBIG compression, as mentioned in the previous first embodiment.

Figure 14:
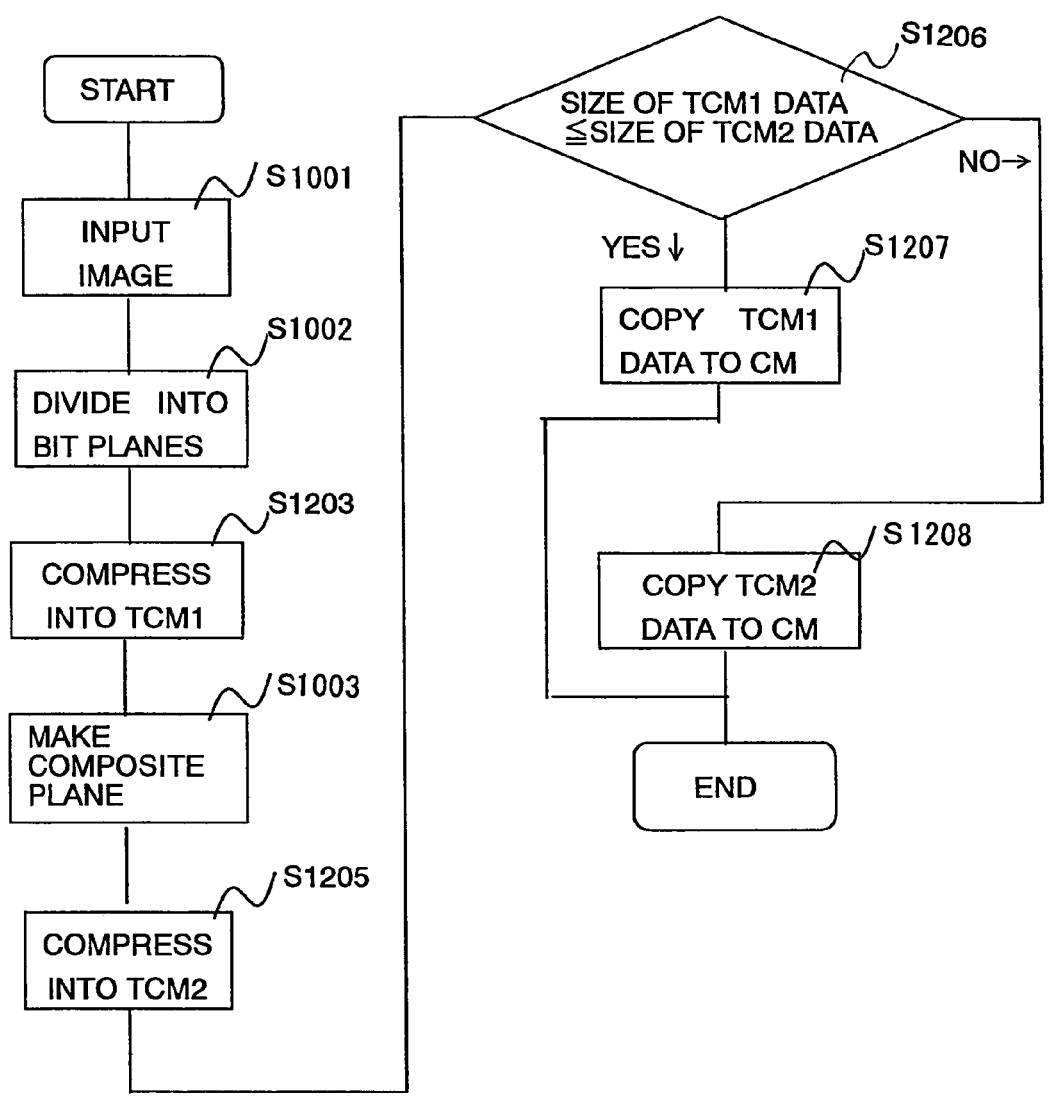
FIG. 14 is a flow chart of an image coding process of the third embodiment.

An image coding process using the image coding apparatus of FIG. 13 will be described here with reference to FIG. 14.

The processes of S1101 and S1102 are similar to those of the first embodiment. Therefore, detailed description thereof will not be repeated.

The content of bit plane memory 304 is compressed for every plane at data compressor 806 to be stored in first temporary compressed data memory 807 (S1203).

Similar to S1003 of the first embodiment, data of respective bit planes stored in bit plane memory 304 are combined into a composite plane at image preprocessor 305 (S1003).

The produced composite plane is compressed at data compressor 806 and stored in second temporary compressed data memory 808 (S1205).

Data size comparator 809 compares the size of data stored in first temporary compressed data memory 807 (referred to as "D1" hereinafter) with the size of the data stored in second temporary compressed data memory 808 (referred to as "D2" hereinafter) (S1206). When the value of D2 is equal to or larger than the value of D1 (YES at S1206), the contents of first temporary compressed data memory 807 are copied into compressed data memory 307 (S1207). When the value of D2 is smaller than the value of D1, the contents of second temporary compressed data memory 808 are copied into compressed data memory 307 (S1208).

The reason why S1207 and S1208 are provided will be described here. The purpose of producing a composite plane for compression is to achieve a higher compression ratio than by compressing each plane taking advantage of the correlation between planes. This is based on the empirical fact that correlation is established between planes, which is as shown in FIGS. 1–4. In theory, there may be little correlation between planes. In such a case, the compression ratio will not necessarily be increased by first producing a composite plane and then compressing the same. In view of the foregoing, the conventional compression for each plane is to be carried out in such a case to achieve a high compression ratio independent of the type of the image. Although the method of carrying out compression for each plane at S1203 and the method of carrying out compression of a composite plane at S1205 are identical here, different methods may be employed instead.

Since information about the number of included planes and the range of compressed data corresponding to each plane is included in the compressed data in the JBIG scheme, determination of whether the compressed data corresponds to a composite plane or data compressed for each plane can be made readily in the decoding process. However, in the case of a compression scheme that does not particularly define how data of a plurality of planes is compressed, consideration is required as to the arrangement of the contents in first temporary compressed data memory 807 so as to discriminate the compressed data of each plane in the decoding process. Such an example is shown in FIG. 15. Specifically, the range of the presence of data in each plane can be rendered definite by storing the number of planes and the number of bytes of the compressed data in each plane at the beginning.

According to the present embodiment, the method of compressing a plurality of bit planes after being combined into a single bit plane and the method of compressing the plurality of bit planes individually can both be accommodated. Thus, the most appropriate compression method can always be employed independent of the property of data of the original image.

Fourth Embodiment

Figure 16:
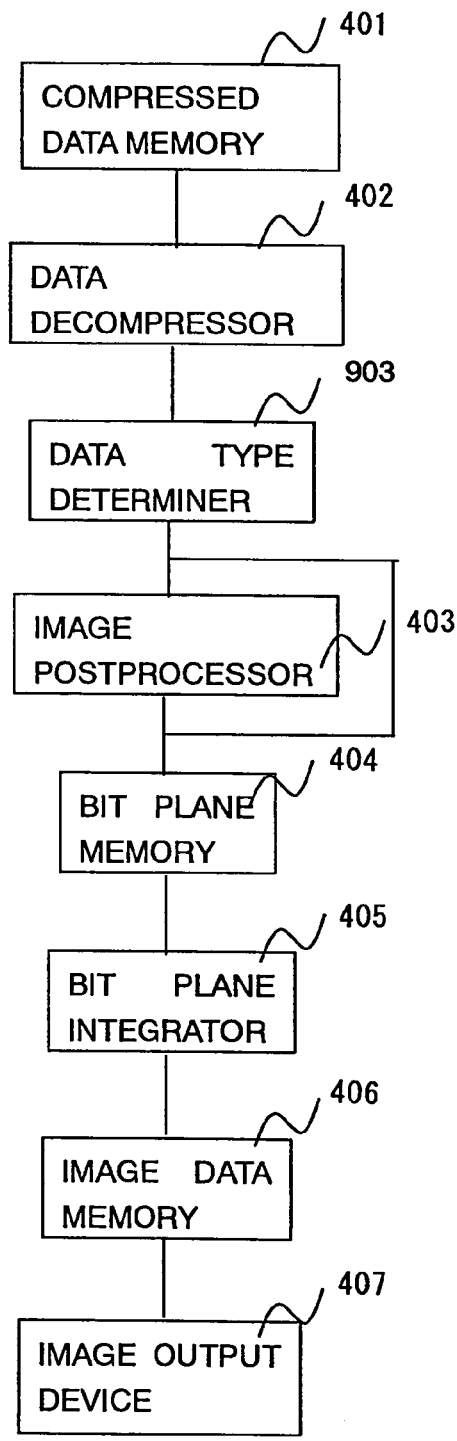
FIG. 16 is a block diagram showing a hardware structure of an image decoding apparatus according to a fourth embodiment.

Referring to FIG. 16, an image decoding apparatus corresponding to the image coding apparatus of the third embodiment includes a compressed data memory 401, a data decompressor 402 connected to compressed data memory 401, a data type determiner 903 connected to data decompressor 402 to determine the type of plane data decompressed at data decompressor 402, an image postprocessor 403 connected to data type determiner 903 to decompose a composite plane into bit planes based on the determination result of data type determiner 903, a bit plane memory 404 connected to data type determiner 903 and image postprocessor 403 to store bit planes, a bit plane integrator connected to bit plane memory 404, an image data memory 406 connected to bit plane integrator 405, and an image output device 407 connected to image data memory 406.

Since the present embodiment corresponds to the third embodiment, the JBIG scheme is employed in the decompression process of data decompressor 402.

Components corresponding to those in FIG. 10 have the same reference characters allotted. Since the function and structure are similar, detailed description thereof will not be repeated here.

Figure 17:
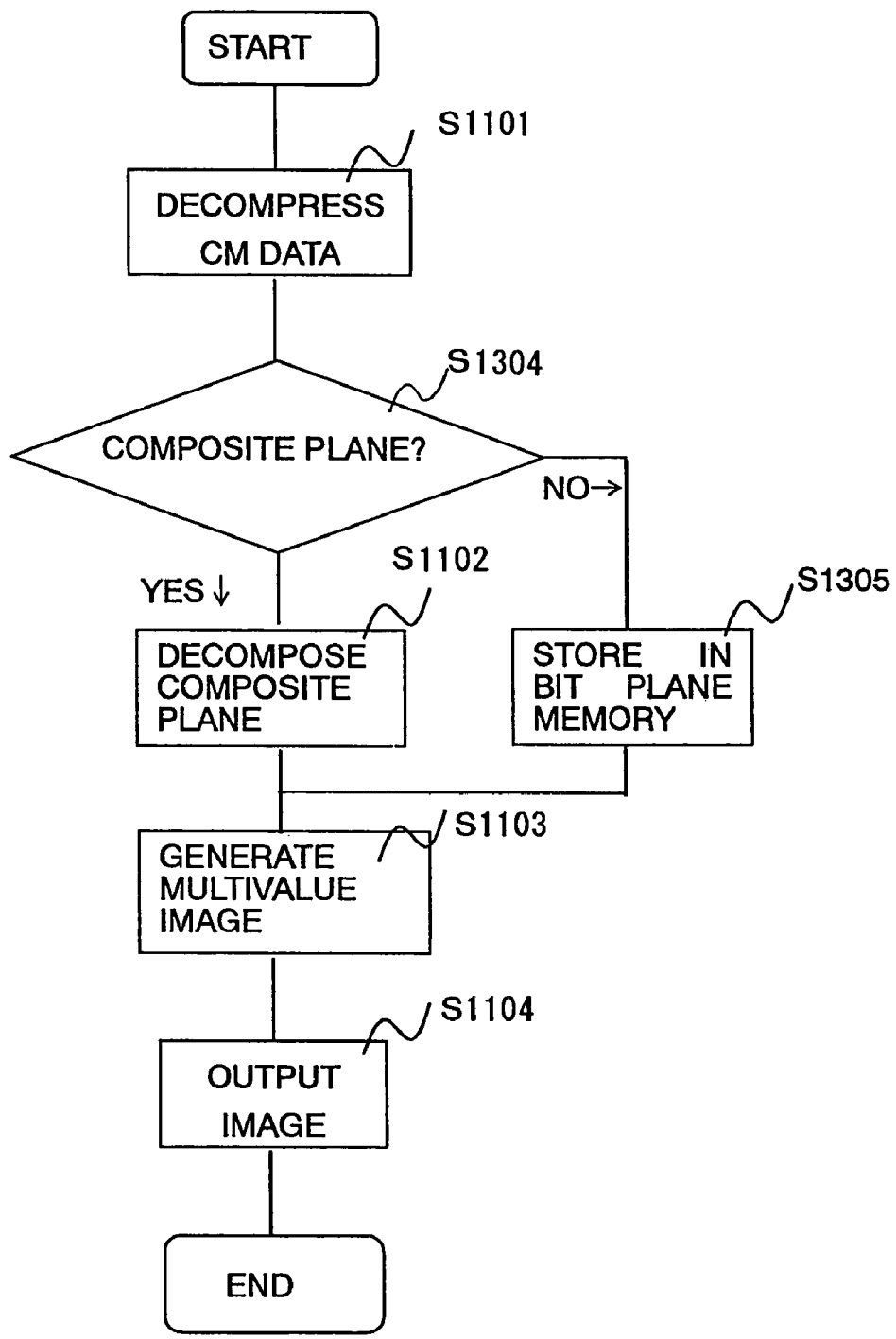
FIG. 17 is a flow chart of an image decoding process of the fourth embodiment.

An image decoding process by the image decoding apparatus of the present embodiment will be described hereinafter with reference to FIG. 17.

The compressed data stored in compressed data memory 401 is decompressed by data decompressor 402 (S1101). Data type determiner 903 identifies whether the compressed data prior to decompression corresponds to compressed data of a plurality of bit planes after being combined into a single bit plane or data of a plurality of bit planes compressed individually (S1304). This identification method is performed by reading out the number of planes included in the compressed data from the compressed data. The JBIG compression scheme employed in the present embodiment takes advantage of the fact that information corresponding to the number of planes is stored at the header section of the compressed data according to the rule thereof. In the case where a compression scheme that does not include information corresponding to the aforementioned identification method is employed, the number of planes and the number of bytes of data to be decompressed can readily be obtained by using the data format as shown in FIG. 15, for example. If the size of the original image (or each bit plane prior to combining) is known, identification can be made by comparing that size with the size of the image decompressed at data decompressor 402. This is based on the fact that the vertical width or horizontal width of a composite plane is always an integer multiple of the original image (or each bit plane prior to combining). For example, in the composite method as shown in FIG. 8, the input compressed data can be easily identified whether it corresponds to a composite plane or not since the vertical width of the composite plane is three times that of the original image (or each bit plane prior to combining).

When determination is made that the compressed data corresponds to a composite plane as a result of the identification (YES at S1304), the process of S1102–S1104 is executed. These processes are similar to those described with reference to FIG. 11. Therefore, detailed description thereof will not be repeated here.

When the data does not correspond to a composite plane (NO at S1304), the composite plane does not have to be decomposed. Therefore, the output of data decompressor 402 is stored directly in bit plane memory 404 without passing through image postprocessor 403 (S1305). Then, the process of S1103 and S1104 is executed.

In the present embodiment, determination is made whether the compressed data corresponds to a composite plane or not after data decompression. It is also possible to determine whether the compressed data corresponds to a composite plane without conducting data decompression, if dispensable.

In such a case, a higher compression ratio can be achieved by employing another compression scheme at data decompressor 402 depending upon whether the compressed data corresponds to a composite plane or compressed data for every plane, as described in the third embodiment.

According to the present embodiment, data of a plurality of bit planes compressed after being combined into a single bit plane and data of a plurality of bit planes compressed individually can both be decoded according to the output result of the data type determiner.

Fifth Embodiment

The present embodiment is directed to an image coding apparatus that achieves a higher compression ratio by producing a composite plane from a series of continuous images of high similarity instead of a plurality of bit planes produced from the same image for compression.

Figure 18:
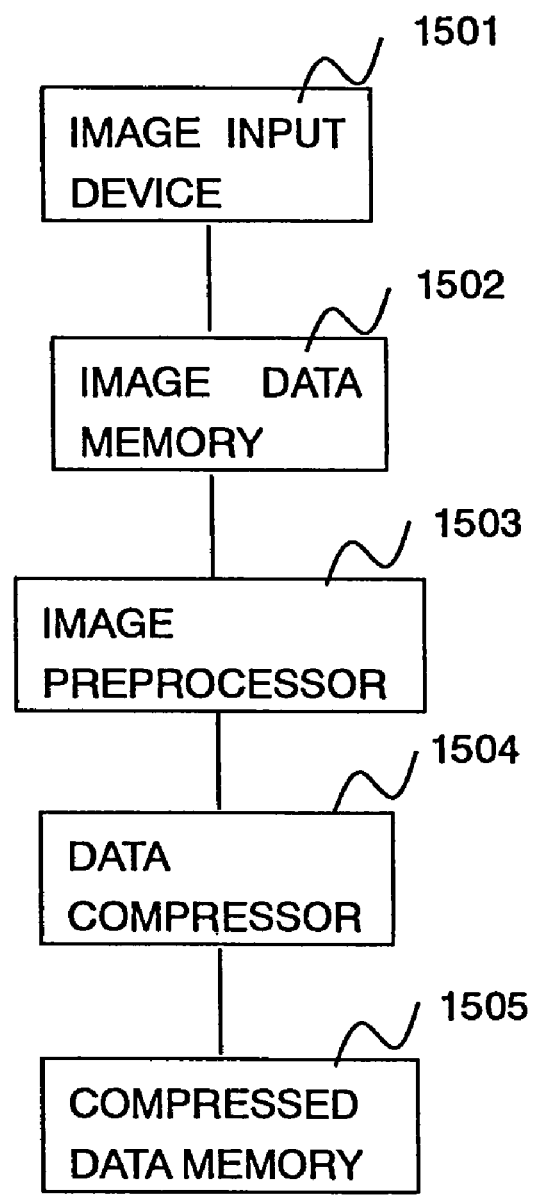
FIG. 18 is a block diagram showing a hardware structure of an image coding apparatus of a fifth embodiment.

Referring to FIG. 18, an image coding apparatus according to the fifth embodiment includes an image input device 1501 for entering a continuous image, an image data memory 1502 connected to image input device 1501 to store image data input continuously through image input device 1501, an image preprocessor 1503 connected to image data memory 1502 to generate a composite plane from the image data continuously input, a data compressor 1504 connected to image preprocessor 1503 to compress a composite plane, and a compressed data memory 1505 connected to data compressor 1504 to store compressed data output from data compressor 1504.

Figure 19:
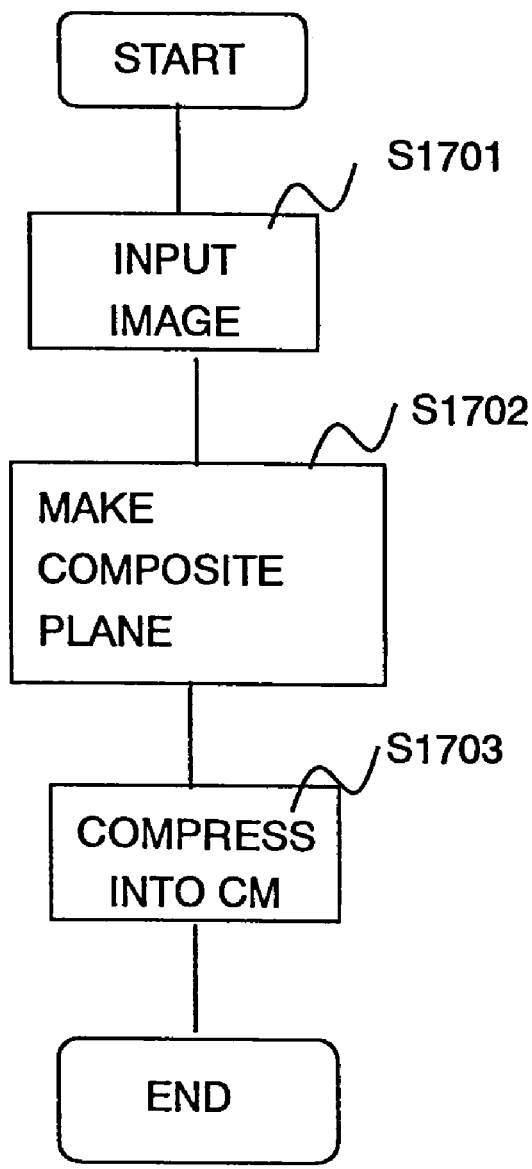
FIG. 19 is a flow chart of an image coding process of the fifth embodiment.

An image coding process using the image coding apparatus of FIG. 18 will be described hereinafter with reference to FIG. 19. The continuous image input from image input device 1501 is stored in image data memory 1502 (S1701).

Image data memory 1502 is configured to allow storage of a plurality of image data. Although it is assumed that the input is a color image of 256 gray scale levels taking the values of 0–255 in the present embodiment, the number of gray scale levels and the type of image (color image or binary image) are not limited thereto. In the case where the input image is a color image, the present invention is applicable by preparing a bit plane for each color component (RGB, YCbCr, and the like) and producing a composite plane from respective bit planes.

Image preprocessor 1503 produces a composite plane from the input continuous image (S1702). Specifically, pixels of the same position are selected from a predetermined number of images, and a composite plane is produced so that the selected pixels are posited in close proximity. The present embodiment differs from the first embodiment in that the image of respective bit planes forming a composite plane is not a binary image, but a gray scale image. However, the issue of producing a composite plane so that pixels of high correlation between different images are positioned in close proximity is similar to the first embodiment in which a composite plane is produced so that pixels with a correlation between different planes are located in close proximity. In the present embodiment, a composite plane is produced from four images according to the correspondence shown in FIG. 9. However, a composite plane may be produced from three images according to the correspondence as shown in FIG. 8. The present invention is not limited to these composite methods.

The composite plane produced at image preprocessor 1503 is compressed by data compressor 1504 to be stored in image data memory 1502 (S1073). Although the JPEG (Joint Photographic Experts Group) compression scheme is employed at data compressor 1504 in the present embodiment, any compression scheme can be employed as long as a higher compression ratio can be expected in proportion to a higher similarity of pixels positioned in close proximity. It is known that a high correlation between pixels is substantially equal to less high frequency components (referenced document "Image Information Compression" published by Ohm Corporation (1991)). Since the general image compression scheme utilizes these characteristics, any general compression scheme is applicable to the present invention.

The present embodiment is directed to achieving a higher compression ratio than that achieved as a result of compressing data individually by compressing a plurality of gray scale images after being converted into a composite plane instead of compressing a plurality of gray scale images individually. Continuous frames of a series of a motion picture sequence or a text image taken from the same document has high similarity in each of the images. Therefore, such an effect can be expected.

Furthermore, it is possible to carry out compression using a composite plane only in the case where a higher compression ratio can be achieved by applying the present invention and to carry out compression for each image individually in other cases.

According to the present embodiment, bit data of the same position has a among a plurality of image data such as continuous motion pictures correlation. Taking advantage of this characteristic, the compression size can be reduced by producing unitary image data from a plurality of image data for image compression. Furthermore, the standard scheme of the existing image compression can be accommodated.

Sixth Embodiment

Figure 20:
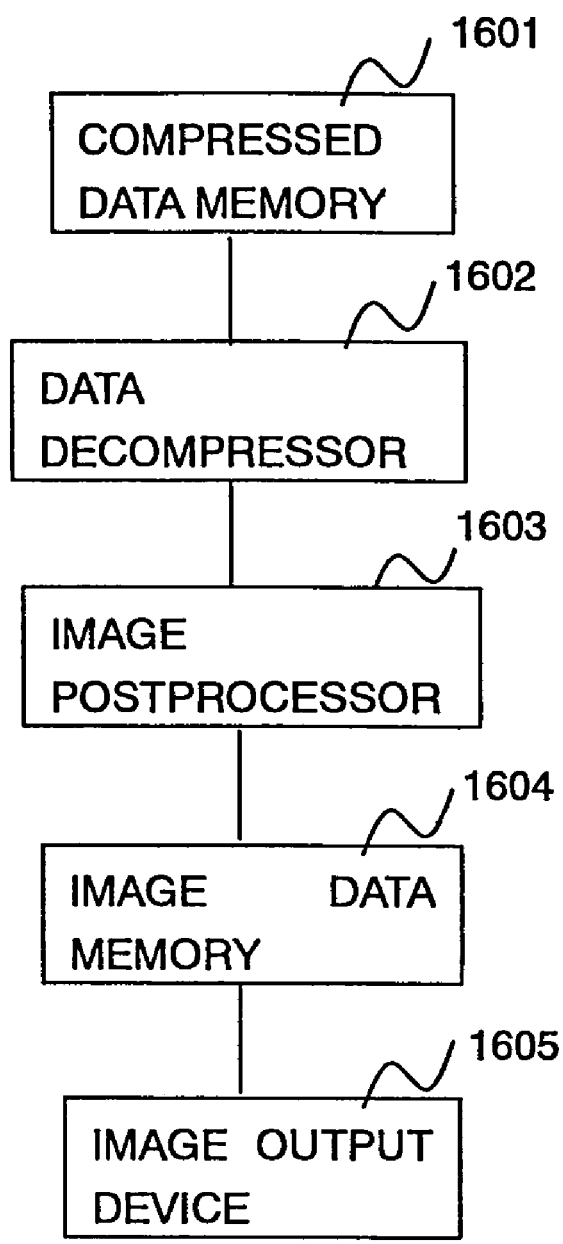
FIG. 20 is a block diagram showing a hardware structure of an image decoding apparatus of a sixth embodiment.

Referring to FIG. 20, an image decoding apparatus corresponding to the image coding apparatus of the fifth embodiment includes a compressed data memory 1601 storing data compressed by the image coding apparatus, a data compressor 1602 connected to compressed data memory 1601 to decompress compressed data, an image postprocessor 1603 connected to data decompressor 1602 to decompose a composite plane output from data decompressor 1602 into a plurality of images, an image data memory 1604 connected to image postprocessor 1603 to store the decomposed plurality of images, and an image output device 1605 connected to image data memory 1604 to display a plurality of images.

Figure 21:
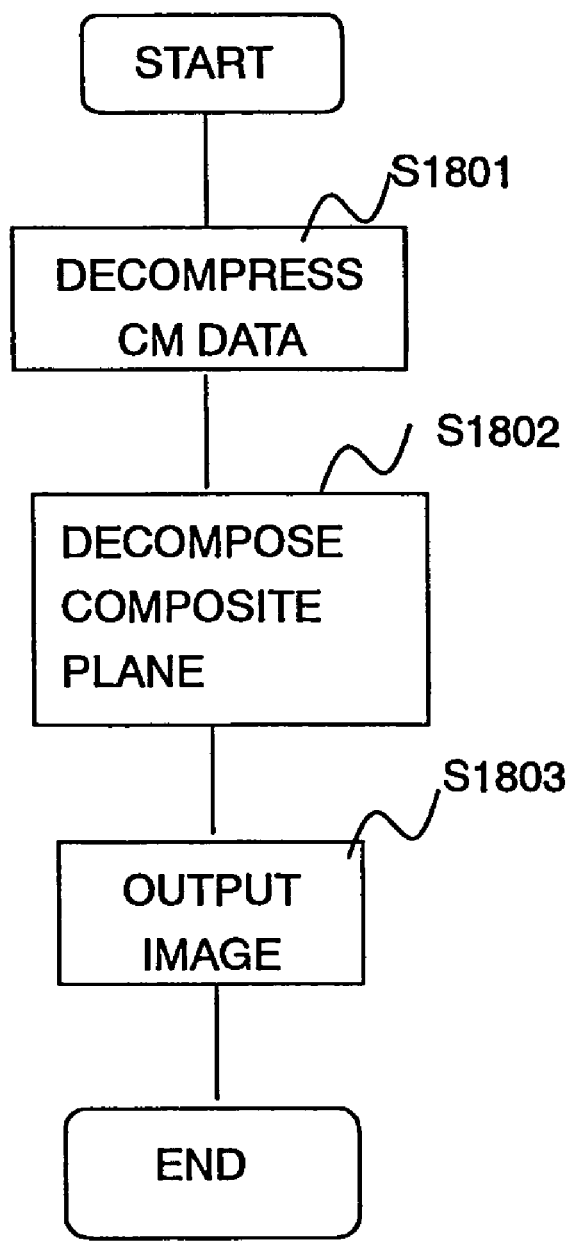
FIG. 21 is a flow chart of an image decoding process of the sixth embodiment.

An image decoding process using the image decoding apparatus of FIG. 20 will be described with reference to FIG. 21. The compressed data output from compressed data memory 1601 is decompressed at data decompressor 1602 and then supplied to image postprocessor 1603 (S1801).

Figure 22:
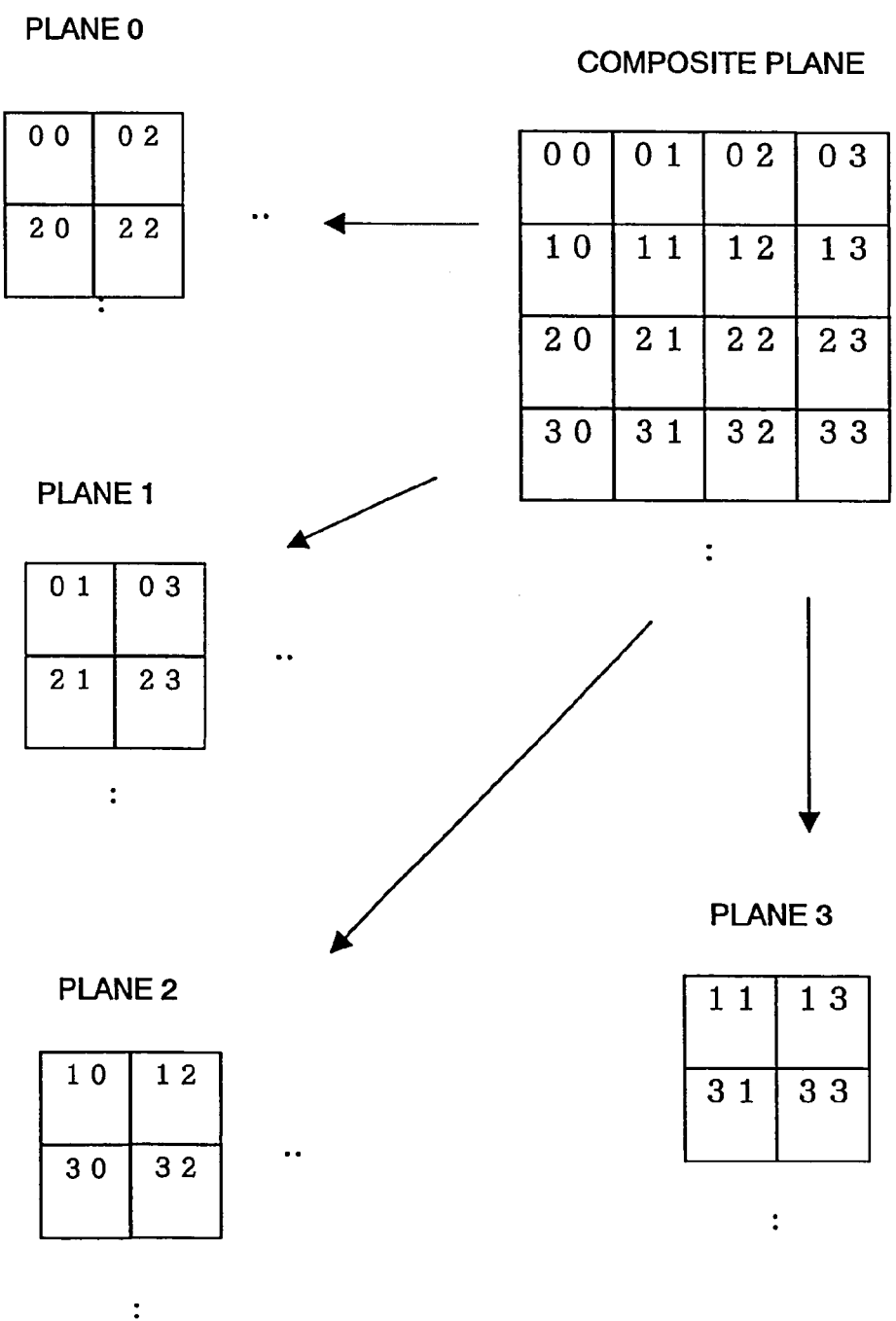
FIG. 22 shows an exemplified method of decomposing a composite plane into four bit planes on a pixel-by-pixel basis.

The decoded composite plane is decomposed into a plurality of images at image postprocessor 1603 and stored in image data memory 1604 (S1802). This decomposing method is to be carried out as shown in FIG. 22, which is opposite to the combining method shown in FIG. 9. If the combining method in the coding process differs, the decomposing method will differ accordingly. The plurality of image data stored in the image data memory is output from image output device 1605.

According to the present embodiment, the image data coded by the image coding apparatus of the fifth embodiment can be decoded.

Regarding the above-described first to sixth embodiments, the flow chart of the processing procedure of the coding apparatus or decoding apparatus of respective embodiments can be implemented by a program executed on a computer. In this case, each program is provided through a computer-readable recording medium such as a magnetic disk or a CD-ROM (Compact Disc-Read Only Memory). Each program can be supplied from another computer through a communication network.

According to the present invention, the correlation between each bit plane and the standard image compression can be utilized in the compression process of unitary image data. Therefore, a higher compression ratio can be achieved while utilizing the currently-available hardware or software modules.

The process of producing a composite plane can be alleviated since the process can be effected on a line-by-line basis in the composite plane producing step.

Since utilization of a composite plane can be selected according to the compression ratio, a higher compression ratio can always be achieved independent of the type of the image. Furthermore, decoding thereof can be effected.

Since the correlation between each bit plane and the standard image compression can be utilized in the compression process of a plurality of image data of high similarity, a higher compression ratio can be achieved while using the currently-available hardware or software modules.

INDUSTRIAL APPLICABILITY

Thus, the present invention is applicable to achieve a higher compression ratio while utilizing a hardware or software module that performs the existing image compression process.

What is claimed is:

1. An image coding apparatus comprising:
   a bit plane generator (303) dividing unitary image data into a plurality of bit planes determined depending upon the number of bits forming each pixel,
   an image preprocessor (305) connected to said bit plane generator (303) to arrange bit data of the same position forming said plurality of bit planes in close proximity to combine said plurality of bit planes into a single bit plane, and a data compressor (306) connected to said image preprocessor (305) to compress an image of said single bit plane.

2. The image coding apparatus according to claim 1, wherein said image preprocessor (305) extracts data sequentially one line at a time from said plurality of bit planes to combine said plurality of bit planes into a single bit plane.

3. The image coding apparatus according to claim 1, wherein said data compressor (306) comprises
a composite plane data compressor (806) connected to said image preprocessor to compress an image of said single bit plane, and
a bit plane data compressor (806) connected to said image preprocessor to compress an image of each of said plurality of bit planes,
said image coding apparatus further comprising a data size comparator (809) connected to said composite plane data compressor and said bit plane data compressor to compare a data size of said single bit plane after image compression with a sum of a data size of each of said plurality of bit planes after image compression, and employing the data of smaller size as compressed data,
wherein said bit plane data compressor (806) and said composite plane data compressor (806) employ a common image compression method taking advantage of a correlation between pixels positioned in close proximity.

4. An image decoding apparatus decoding data compressed by the image coding apparatus recited in claim 1, comprising:
a data decompressor (402) decompressing said data to a single bit plane,
an image postprocessor (403) connected to said data decompressor (402) to decompose said single bit plane combined by arranging bit data of the same position forming a plurality of bit planes in close proximity into said plurality of bit planes, and
a bit plane integrator (405) connected to said image postprocessor (403) to integrate said plurality of bit planes into image data with a value of each pixel of said plurality of bit planes as a bit value of each pixel.

5. An image decoding apparatus decoding data coded by the image coding apparatus recited in claim 3, comprising:
a data decompressor (402) decompressing said data to a single bit plane,
a data type determiner (903) connected to said data decompressor (402) to determine whether the single bit plane decompressed by said data decompressor (402) is a bit plane corresponding to a plurality of bit planes compressed after being combined into a single bit plane or a bit plane corresponding to a plurality of bit planes compressed individually,
an image postprocessor (403) connected to said data type determiner (903) to selectively execute whether to decompose said single bit plane into a plurality of bit planes based on an output of said data type determiner (903), and
a bit plane integrator (405) connected to said image postprocessor (403) to integrate said plurality of bit planes into image data with a value of each pixel of said plurality of bit planes as a bit value of each pixel,
wherein said data decompressor (402) employs a common image decompression method regardless of whether said single bit plane corresponds to data of a plurality of bit planes combined into a single bit plane or a bit plane corresponding to a plurality of bit planes compressed individually.

6. The image decoding apparatus according to claim 5, wherein said data type determiner (903) determines whether the decompressed single bit plane is a bit plane corresponding to a plurality of bit planes compressed after being combined into a single bit plane based on a comparison result between a horizontal width or vertical width of the composite plane and the horizontal width or vertical width of an original image.

7. An image coding apparatus comprising:
a bit plane generator (303) dividing unitary image data into a plurality of bit planes determined according to the number of bits forming each pixel,
an image preprocessor (305) connected to said bit plane generator (303) to combine said plurality of bit planes into a single bit plane so that pixels of high correlation belonging to different bit planes are pixels positioned in close proximity, and
a data compressor (306) connected to said image preprocessor (305) to compress an image of said single bit plane according to a compression method taking advantage of a high correlation between pixels positioned in close proximity.

8. The image coding apparatus according to claim 7, wherein said image preprocessor (305) extracts data sequentially one line at a time from said plurality of bit planes to combine said plurality of bit planes into a single bit plane.

9. The image coding apparatus according to claim 7, wherein said data compressor (306) comprises
a composite plane data compressor (806) connected to said image preprocessor to compress an image of said single bit plane, and
a bit plane data compressor (806) connected to said image preprocessor to compress an image of each of said plurality of bit planes,
said image coding apparatus further compressing a data size comparator (809) connected to said composite plane data compressor and said bit plane data compressor to compare a data size of said single bit plane after image compression with a sum of a data size of each of said plurality of bit planes after image compression, and employing the data of smaller size as compressed data,
wherein said bit plane data compressor (806) and said composite plane data compressor (806) employ a common image compression method taking advantage of a correlation between pixel positioned in close proximity.

10. An image decoding apparatus decoding data compressed by the image coding apparatus recited in claim 7, comprising:
a data decompressor (402) decompressing said data to a single bit plane,
an image postprocessor (403) connected to said data decompressor (402) to decompose said single bit plane combined so that pixels of high correlation belonging to different bit planes are pixels positioned in close proximity into said plurality of bit planes, and
a bit plane integrator (405) connected to said image postprocessor (403) to integrate said plurality of bit planes into image data with a value of each pixel of said plurality of bit planes as a bit value of each pixel.

11. An image coding apparatus comprising:
an image preprocessor (1503) arranging bit data of the same position forming a plurality of image data input continuously in close proximity to combine said plurality of image data into unitary image data, and a data compressor (1504) connected to said image preprocessor (1503) to compress an image of said unitary image data.

12. An image decoding apparatus decoding data compressed by the image coding apparatus recited in claim 11, comprising:

a data decompressor (1602) decompressing said data into unitary image data, and an image postprocessor (1603) connected to said data decompressor (1602) to decompose said unitary image data combined by arranging bit data of the same position forming a plurality of image data in close proximity into said plurality of image data.

13. An image coding method comprising the steps of:

dividing unitary image data into a plurality of bit planes determined depending on the number of bits forming each pixel (S1002), arranging bit data of the same position forming said plurality of bit planes in close proximity to combine said plurality of bit planes into a single bit plane (S1003), and compressing an image of said single bit plane (S1004).

14. The image coding method according to claim 13, wherein said stop of combining (S1003) comprises the step of extracting data sequentially one line at a time from said plurality of bit planes to combine said plurality of bit planes into a single bit plane (S1003).

15. The image coding method according to claim 13, wherein said step of compressing an image (S1004) comprises the steps of compressing an image of said single bit plane (S1205), and compressing an image of each of said plurality of bit planes (S1203), said method further comprising the step of comparing a data size of said single bit plane after image compression with a sum of the data size of each of said plurality of bit planes after image compression, and employing data of the smaller size as compressed data (S1206–1208), wherein a common image compression method taking advantage of a correlation between pixels positioned in close proximity is used regardless of whether said single bit plane corresponds to data of a plurality of bit planes combined into a single bit plane or a bit plane corresponding to a plurality of bit planes compressed individually.

16. An image decoding method of decoding data compressed by the image coding method recited in claim 13, said method comprising the steps of:

decompressing said data to a single bit plane (S1101), decomposing said single bit plane combined by arranging bit data of the same position forming a plurality of bit planes in close proximity into said plurality of bit planes (S1102), and integrating said plurality of bit planes into image data with a value of each pixel of said plurality of bit planes as a bit value of each pixel (S1103).

17. An image decoding method of decoding data coded by the image coding method recited in claim 15, comprising the steps of:

decompressing said data to a single bit plane (S1101), determining whether the decompressed single bit plane corresponds to data of a plurality of bit planes combined into a single bit plane or a bit plane corresponding to a plurality of bit planes compressed individually (S1304), selectively executing decomposing said single bit plane into a plurality of bit planes based on a determination result (S1102, S1305), and integrating said plurality of bit planes into image data with a value of each pixel of said plurality of bit planes as a bit value of each pixel (S1103), wherein said step of decompressing (S1101) employs a common image decompression method regardless of whether said single bit plane corresponds to data of a plurality of bit planes combined into a single bit plane or a bit plane corresponding to a plurality of bit planes compressed individually.

18. The image decoding method according to claim 17, wherein said step of determining (S1304) determines whether the decompressed single bit plane is a bit plane corresponding to a plurality of bit planes compressed after being combined into a single bit plane based on a comparison result between a horizontal width or vertical width of the composite plane and the horizontal width or vertical width of an original image.

19. An image coding method comprising the steps of:

dividing unitary image data into a plurality of bit planes determined depending on the number of bits forming each pixel (S1002), combining said plurality of bit planes into a single bit plane so that pixels of high correlation belonging to different bit planes are pixels positioned in close proximity (S1003), and compressing an image of said single bit plane by a compression method taking advantage of a correlation between pixels positioned in close proximity (S1004).

20. The image coding method according to claim 19, wherein said step of combining (S1003) comprises the step of extracting data sequentially one line at a time from said plurality of bit planes to combine said plurality of bit planes into a single bit plane (S1003).

21. The image coding method according to claim 19, wherein said step of compressing an image (S1004) comprises the steps of compressing an image of said single bit plane (S1205), and compressing an image of each of said plurality of bit planes (S1203), said image coding method further comprising the step of comparing a data size of said single bit plane after image compression with a sum of the data size of each of said plurality of bit planes after image compression, and employing data of the smaller size as compressed data (S1206–1208), wherein a common image compression method taking advantage of a correlation between pixels positioned in close proximity is used regardless of whether said single bit plane corresponds to data of a plurality of bit planes combined into a single bit plane or a bit plane corresponding to a plurality of bit planes compressed individually.

22. An image decoding method of decoding data compressed by the image coding method recited in claim 19, comprising the steps of:

decompressing said data to a single bit plane (S1101), decomposing said single bit plane combined so that pixels of high correlation belonging to different bit planes are pixels positioned in close proximity into said plurality of bit planes (S1102), and integrating said plurality of bit planes into image data with a value of each pixel of said plurality of bit planes as a bit value of each pixel (S1103).

23. An image coding method comprising the steps of:
arranging bit data of the same position forming a plurality of image data input continuously in close proximity to combine said plurality of image data into unitary image data (S1702), and
compressing an image of said unitary image data (S1703).

24. An image decoding method of decoding data compressed by the image coding method recited in claim 23, comprising the steps of:
decompressing said data to unitary image data (S1801), and
decomposing said unitary image data combined by arranging bit data of the same position forming a plurality of image data in close proximity into said plurality of image data (S1802).

25. A computer-readable recording medium recorded with an image coding program causing a computer to execute the steps of:
dividing unitary image data into a plurality of bit planes determined depending on the number of bits forming each pixel (S1002),
arranging bit data of the same position forming said plurality of bit planes in close proximity to combine into a single bit plane (S1003), and
compressing an image of said single bit plane (S1004).

26. The computer-readable recording medium according to claim 25, wherein said step of combining (S1003) comprises the step of extracting data sequentially one line at a time from said plurality of bit planes to combine said plurality of bit planes into a single bit plane (S1003).

27. The computer-readable recording medium according to claim 25, wherein said step of compressing an image (S1004) comprises the steps of
compressing an image of said single bit plane (S1205), and
compressing an image of each of said plurality of bit planes (S1203),
said image coding program further comprising the step of comparing a data size of said single bit plane after image compression with a sum of the data size of each of said plurality of bit planes after image compression, and employing data of the smaller size as compressed data (S1206–1208),
wherein a common image compression method taking advantage of a correlation between pixels positioned in close proximity is used regardless of whether said single bit plane corresponds to data of a plurality of bit planes combined into a single bit plane or a bit plane having a plurality of bit planes compressed individually.

28. A computer-readable recording medium recorded with an image decoding program of decoding data compressed by executing the image coding program recited in claim 25, said computer-readable recording medium recorded with the image decoding program causing a computer to execute the steps of:
decompressing said data to a single bit plane (S1101),
decomposing said single bit plane combined by arranging bit data of the same position forming a plurality of bit planes in close proximity into said plurality of bit planes (S1102), and
integrating said plurality of bit planes into image data with a value of each pixel of said plurality of bit planes as a bit value of each pixel (S1103).

29. A computer-readable recording medium recorded with an image decoding program of decoding data compressed by executing the image coding program recited in claim 27, said computer-readable recording medium recorded with the image decoding program causing a computer to execute the steps of:
decompressing said data to a single bit plane (S1101),
determining whether the decompressed single bit plane is a bit plane corresponding to a plurality of bit planes compressed after being combined into a single bit plane or a bit plane corresponding to a plurality of bit planes compressed individually (S1304),
selectively executing decomposing said single bit plane into a plurality of bit planes based on a determination result (S1102, S1305), and
integrating said plurality of bit planes into image data with a value of each pixel of said plurality of bit planes as a bit value of each pixel (S1103),
wherein said step of decompressing (S1101) employs a common image decompression method regardless of whether said single bit plane corresponds to data of a plurality of bit planes combined into a single bit plane or a bit plane corresponding to a plurality of bit planes compressed individually.

30. The computer-readable recording medium according to claim 29, wherein said step of determining (S1304) determines whether the decompressed single bit plane is a bit plane corresponding to a plurality of bit planes compressed after being combined into a single bit plane based on a comparison result between a horizontal width or a vertical width of the composite plane and the horizontal width or vertical width of an original image.

31. A computer-readable recording medium recorded with an image coding program causing a computer to execute the steps of:
dividing unitary image data into a plurality of bit planes determined depending on the number of bits forming each pixel (S1002),
combining said plurality of bit planes into a single bit plane so that pixels of high correlation belonging to different bit planes are pixels positioned in close proximity (S1003) and
compressing an image of said single bit plane by a compression method taking advantage of a correlation between pixels positioned in close proximity (S1004).

32. The computer-readable recording medium according to claim 31, wherein said step of combining (S1003) comprises the step of extracting data sequentially one line at a time from said plurality of bit planes to combine said plurality of bit planes into a single bit plane (S1003).

33. The computer-readable recording medium according to claim 31, wherein said step of compressing an image (S1004) comprises the steps of
compressing an image of said single bit plane (S1205), and
compressing an image of each of said plurality of bit planes (S1203),
said image coding program further comprising the step of comparing a data size of said single bit plane after image compression with a sum of the data size of each of said plurality of bit planes after image compression, and employing data of the smaller size as compressed data (S1206–1208), wherein a common image compression method taking advantage of a correlation between pixels positioned in close proximity is used regardless of whether said single bit plane corresponds to data of a plurality of bit planes combined into a single bit plane or a bit plane having a plurality of bit planes compressed individually.

34. A computer-readable recording medium recorded with an image decoding program of decoding data compressed by executing the image coding program recited in claim 31, said computer-readable recording medium recorded with the image decoding program causing a computer to execute the steps of:

decompressing said data to a single bit plane (S1101), decomposing said single bit plane combined so that pixels of high correlation belonging to different bit planes are pixels positioned in close proximity into a plurality of bit planes (S1102), and integrating said plurality of bit planes into image data with a value of each pixel of said plurality of bit planes as a bit value of each pixel (S1103).

35. A computer-readable recording medium recorded with an image coding program causing a computer to execute the steps of:

arranging bit data of the same position forming a plurality of image data input continuously in close proximity to combine said plurality of image data into unitary image data (S1702), and compressing an image of said unitary image data (S1703).

36. A computer-readable recording medium recorded with an image decoding program of decoding data compressed by executing the image coding program recited in claim 35, said computer-readable recording medium recorded with the image decoding program causing a computer to execute the steps of:

decompressing said data to unitary image data (S1801), and decomposing said unitary image data combined by arranging bit data of the same position forming a plurality of image data in close proximity into said plurality of image data (S1802).

* * * * *